US012703499B1

(12) United States Patent
Clark et al.

(10) Patent No.: US 12,703,499 B1
(45) Date of Patent: Aug. 11, 2026

(54) AIRCRAFT SYSTEM WITH HEAT EXCHANGER FOR ENVIRONMENTAL CONTROL SYSTEM

(71) Applicant: RTX Corporation, Farmington, CT (US)

(72) Inventors: Thomas E. Clark, Wells, ME (US); Murat Yazici, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/197,667

(22) Filed: May 2, 2025

(51) Int. Cl.

| | |
|---|---|
| ***B64D 33/10*** | (2006.01) |
| ***B64D 13/06*** | (2006.01) |
| ***B64D 13/08*** | (2006.01) |
| ***B64D 33/08*** | (2006.01) |

(52) U.S. Cl.
CPC ............ *B64D 33/10* (2013.01); *B64D 13/08* (2013.01); *B64D 33/08* (2013.01); *B64D 2013/0603* (2013.01)

(58) Field of Classification Search
CPC .... B64D 2013/0603; B64D 2013/0618; B64D 33/10; B64D 33/08; B64D 13/08
See application file for complete search history.

(56) References Cited

U.S. PATENT DOCUMENTS

| | | | | |
|---|---|---|---|---|
| 11,391,210 | B2 | 7/2022 | Ribarov | |
| 2016/0229541 | A1* | 8/2016 | Bruno | B64D 13/08 |
| 2017/0284303 | A1* | 10/2017 | Johnson | F02K 3/075 |
| 2018/0051716 | A1* | 2/2018 | Cheung | H02K 7/14 |
| 2020/0300164 | A1* | 9/2020 | Muldoon | F02C 7/185 |
| 2020/0346761 | A1* | 11/2020 | Caron | F15B 15/14 |

* cited by examiner

*Primary Examiner* — Ashesh Dangol
(74) *Attorney, Agent, or Firm* — Getz Balich LLC

(57) ABSTRACT

An aircraft system includes an environmental control system and a propulsion system. The propulsion system includes a compressor section, a combustor section, a turbine section, a bypass flowpath, an air circuit, a working fluid system and a heat exchanger. The bypass flowpath bypasses the compressor section, the combustor section and the turbine section. The air circuit includes a circuit inlet fluidly coupled to the bypass flowpath. The air circuit is configured to direct air received from the bypass flowpath through the circuit inlet to the environmental control system. The working fluid system includes a fluid circuit. The working fluid system is configured to service one or more components of the propulsion system using a liquid working fluid directed through the fluid circuit. The heat exchanger is configured to transfer heat energy between the air in the air circuit and the liquid working fluid in the fluid circuit.

19 Claims, 5 Drawing Sheets

AIRCRAFT SYSTEM WITH HEAT EXCHANGER FOR ENVIRONMENTAL CONTROL SYSTEM

BACKGROUND OF THE DISCLOSURE

1. Technical Field

This disclosure relates generally to an aircraft and, more particularly, to a heat exchanger for an environmental control system (ECS) of the aircraft.

2. Background Information

An aircraft may include an environmental control system (ECS) for conditioning air provided to an interior of the aircraft. Various types and configurations of environmental control systems and air sources for environmental control systems are known in the art. While these known environmental control systems and air sources have various benefits, there is still room in the art for improvement.

SUMMARY OF THE DISCLOSURE

According to an aspect of the present disclosure, a system is provided for an aircraft. This aircraft system includes an environmental control system and a propulsion system. The propulsion system includes a compressor section, a combustor section, a turbine section, a bypass flowpath, an air circuit, a working fluid system and a heat exchanger. The bypass flowpath bypasses the compressor section, the combustor section and the turbine section. The air circuit includes a circuit inlet fluidly coupled to the bypass flowpath. The air circuit is configured to direct air received from the bypass flowpath through the circuit inlet to the environmental control system. The working fluid system includes a fluid circuit. The working fluid system is configured to service one or more components of the propulsion system using a liquid working fluid directed through the fluid circuit. The heat exchanger is configured to transfer heat energy between the air in the air circuit and the liquid working fluid in the fluid circuit.

According to another aspect of the present disclosure, another system is provided for an aircraft. This aircraft system includes a turbine engine, an air system, a working fluid system and a heat exchanger. The turbine engine includes an air source and a plurality of engine components. The air system includes an air circuit and an environmental control system. The air circuit is configured to direct air received from the air source to the environmental control system. The working fluid system includes a fluid circuit. The working fluid system is configured to lubricate and/or cool the engine components using a working fluid directed through the fluid circuit. The heat exchanger is arranged along the air circuit between the air source and the environmental control system. The heat exchanger is configured to transfer heat energy between the air in the air circuit and the working fluid in the fluid circuit to heat the air and cool the working fluid.

According to still another aspect of the present disclosure, another system is provided for an aircraft. This aircraft system includes a turbine engine, an air system, a working fluid system and a heat exchanger. The turbine engine includes a compressor section, a combustor section, a turbine section, a core flowpath, an air source and a plurality of engine components. The core flowpath extends through the compressor section, the combustor section and the turbine section. The air source is discrete from the core flowpath. The air system includes an air circuit and an environmental control system. The air circuit is configured to direct air received from the air source to the environmental control system. The working fluid system includes a fluid circuit. The working fluid system is configured to lubricate and/or cool the engine components using a working fluid directed through the fluid circuit. The heat exchanger is arranged along the air circuit between the air source and the environmental control system. The heat exchanger is configured to transfer heat energy between the air in the air circuit and the working fluid in the fluid circuit.

The air source may be a flowpath outside of the compressor section, the combustor section and the turbine section.

The turbine engine may be a turbofan engine. The air source may be a bypass flowpath of the turbofan engine.

The turbine engine may also include an engine core. The engine core may include a compressor section, a combustor section and a turbine section. The air source may be located outside of the engine core.

The turbine engine may also include a compressor section, a combustor section, a turbine section and a flowpath. The flowpath may extend through the compressor section, the combustor section and the turbine section. The air source may be fluidly independent of the flowpath.

The working fluid may be or otherwise include oil.

The heat exchanger may be configured as: a heater for the air in the air circuit; and a cooler for the liquid working fluid in the fluid circuit.

The liquid working fluid may be or otherwise include lubricant.

The working fluid system may be configured to lubricate the one or more components of the propulsion system using the liquid working fluid directed through the fluid circuit.

The working fluid system may be configured to cool the one or more components of the propulsion system using the liquid working fluid directed through the fluid circuit.

The one or more components of the propulsion system may include a bearing.

The one or more components of the propulsion system may include a gear system.

The aircraft system may also include an air system. The air system may include the environmental control system and the air circuit. The air system may be configured without a compressor between the circuit inlet and the environmental control system.

The propulsion system may also include a core flowpath and a fan section. The core flowpath may extend through the compressor section, the combustor section and the turbine section. The fan section may be upstream of an airflow inlet into the core flowpath and an airflow inlet into the bypass flowpath.

The propulsion system may be configured as a turbofan propulsion system.

The propulsion system may also include an inner housing structure and an outer housing structure. The inner housing structure may house the compressor section, the combustor section and the turbine section. The inner housing structure may form an inner peripheral boundary of the bypass flowpath. The heat exchanger may be disposed in a compartment of the inner housing structure with the circuit inlet along the inner peripheral boundary of the bypass flowpath. The outer housing structure may be spaced radially outboard of the inner housing structure. The outer housing structure may form an outer peripheral boundary of the bypass flowpath.

The propulsion system may also include an inner housing structure and an outer housing structure. The inner housing structure may house the compressor section, the combustor section and the turbine section. The inner housing structure may form an inner peripheral boundary of the bypass flowpath. The outer housing structure may be spaced radially outboard of the inner housing structure. The outer housing structure may form an outer peripheral boundary of the bypass flowpath. The heat exchanger may be disposed in a compartment of the outer housing structure with the circuit inlet along the outer peripheral boundary of the bypass flowpath.

The propulsion system may also include an inner housing structure, an outer housing structure and a vane structure. The inner housing structure may house the compressor section, the combustor section and the turbine section. The inner housing structure may form an inner peripheral boundary of the bypass flowpath. The outer housing structure may be spaced radially outboard of the inner housing structure. The outer housing structure may form an outer peripheral boundary of the bypass flowpath. The vane structure may extend radially across the bypass flowpath from the inner housing structure to the outer housing structure. The heat exchanger may be arranged with the vane structure.

The circuit inlet may be arranged at the inner peripheral boundary of the bypass flowpath.

The circuit inlet may be arranged at the outer peripheral boundary of the bypass flowpath The circuit inlet may be arranged on the vane structure.

The environmental control system may include an electric compressor configured to pressurize the air received from the bypass flowpath through the air circuit to provide pressurized air.

The environmental control system may also include a second heat exchanger configured to cool the pressurized air.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
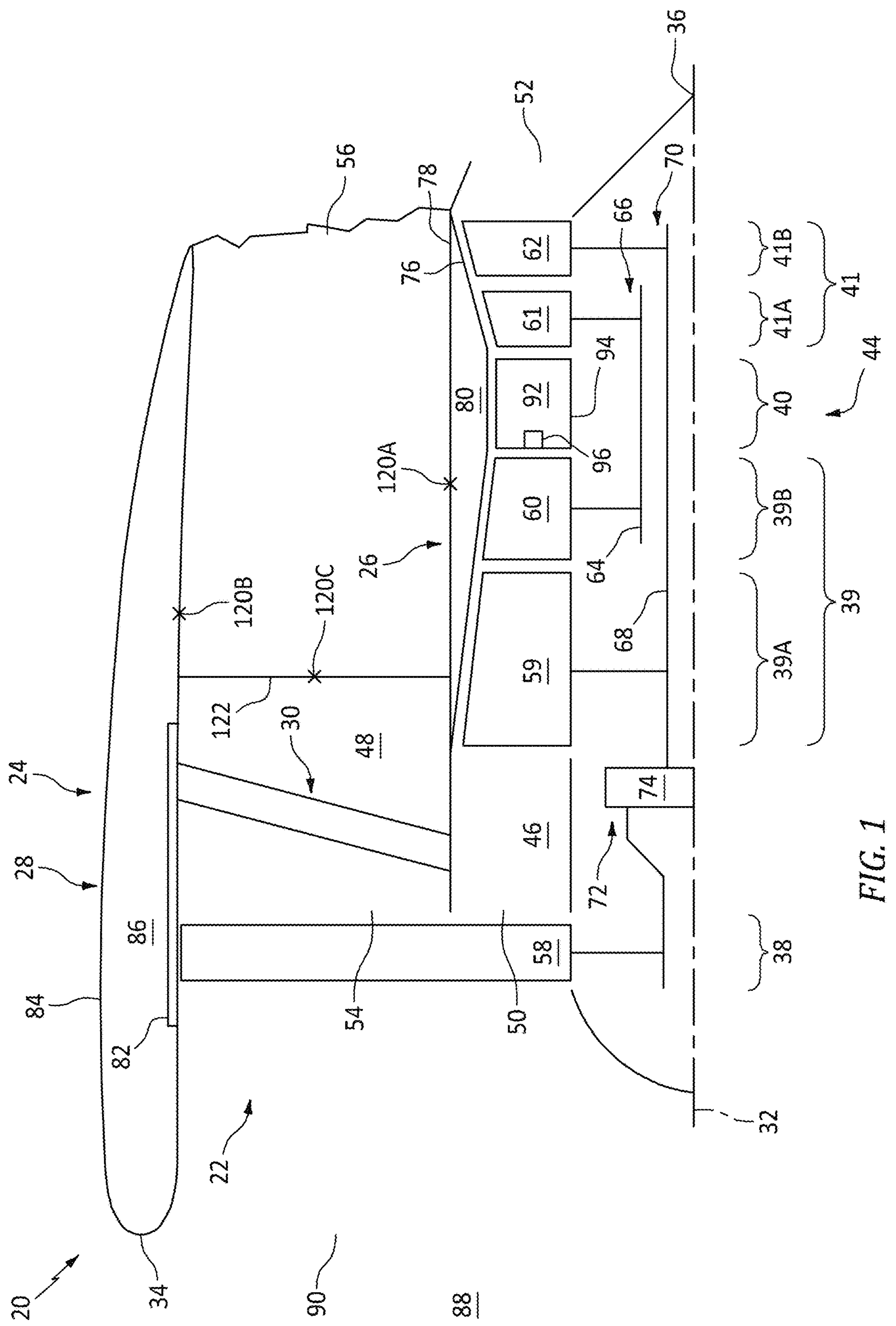
FIG. 1 is a partial schematic illustration of an aircraft propulsion system.

FIG. 1 illustrates a propulsion system 20 for an aircraft. The aircraft may be an airplane, a drone (e.g., an unmanned aerial vehicle (UAV)) or any other manned or unmanned aerial vehicle or system. For ease of description, the aircraft propulsion system 20 is described below as a turbofan propulsion system. The present disclosure, however, is not limited to such an exemplary aircraft propulsion system. The aircraft propulsion system 20, for example, may alternatively be configured as any ducted and/or open propulsor rotor propulsion system with, for example, a bypass flowpath or another pressurized air source as described below.

The aircraft propulsion system 20 includes a gas turbine engine 22 (e.g., a turbofan engine) housed within a stationary propulsion system housing 24. Briefly, the propulsion system housing 24 of FIG. 1 includes an inner housing structure 26, an outer housing structure 28 and a guide vane structure 30 (e.g., a fan exit guide vane (FEGV) structure) extending radially between and connected to the inner housing structure 26 and the outer housing structure 28. The aircraft propulsion system 20 extends axially along an axis 32 of the aircraft propulsion system 20 between an axial upstream, forward end 34 of the aircraft propulsion system 20 and an axial downstream, aft end 36 of the aircraft propulsion system 20. Briefly, the propulsion system axis 32 may be a centerline axis of the aircraft propulsion system 20, the turbine engine 22 and/or one or more of its members. The propulsion system axis 32 may also or alternatively be a rotational axis for one or more members of the turbine engine 22.

The aircraft propulsion system 20 and its turbine engine 22 of FIG. 1 include a propulsor section 38 (e.g., a fan section), a compressor section 39, a combustor section 40 and a turbine section 41. The compressor section 39 of FIG. 1 includes a low pressure compressor (LPC) section 39A and a high pressure compressor (HPC) section 39B. The turbine section 41 of FIG. 1 includes a high pressure turbine (HPT) section 41A and a low pressure turbine (LPT) section 41B. At least (or only) the LPC section 39A, the HPC section 39B, the combustor section 40, the HPT section 41A and the LPT section 41B collectively form a core 44 (e.g., a gas generator) of the turbine engine 22. The aircraft propulsion system 20 and its turbine engine 22 of FIG. 1 also include a core flowpath 46 (e.g., an annular core flowpath) and a bypass flowpath 48 (e.g., an annular bypass flowpath). The core flowpath 46 extends sequentially through the LPC section 39A, the HPC section 39B, the combustor section 40, the HPT section 41A and the LPT section 41B from an airflow inlet 50 into the core flowpath 46 to a combustion products exhaust 52 out from the core flowpath 46. The bypass flowpath 48 extends through a bypass duct from an airflow inlet 54 into the bypass flowpath 48 to an airflow exhaust 56 from the bypass flowpath 48, where the bypass duct may be formed by the inner housing structure 26 and the outer housing structure 28. The bypass flowpath 48 and its bypass duct are configured to bypass (e.g., are disposed radially outboard of and extend along) the engine core 44 and the inner housing structure 26.

The propulsor section 38, the LPC section 39A, the HPC section 39B, the combustor section 40, the HPT section 41A and the LPT section 41B may be arranged sequentially along the propulsion system axis 32 within the propulsion system housing 24. The propulsor section 38 includes a bladed propulsor rotor 58; e.g., a fan rotor. The LPC section 39A includes a bladed low pressure compressor (LPC) rotor 59. The HPC section 39B includes a bladed high pressure compressor (HPC) rotor 60. The HPT section 41A includes a bladed high pressure turbine (HPT) rotor 61. The LPT section 41B includes a bladed low pressure turbine (LPT) rotor 62. Each of these engine rotors 58-62 includes a rotor base (e.g., a disk or a hub) and a plurality of rotor blades (e.g., airfoils, vanes, etc.). The rotor blades may be arranged into one or more stages axially along the respective engine rotor 58-62. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 60 is coupled to and rotatable with the HPT rotor 61. The HPC rotor 60 of FIG. 1, for example, is connected to the HPT rotor 61 through a high speed shaft 64. At least (or only) the HPC rotor 60, the HPT rotor 61 and the high speed shaft 64 collectively form a high speed rotating structure 66; e.g., a high speed spool of the turbine engine 22 and its engine core 44. This high speed rotating structure 66 of FIG. 1 and its members 60, 61 and 64 are rotatable about the propulsion system axis 32. However, it is contemplated the high speed rotating structure 66 may alternatively be rotatable about another axis radially and/or angularly offset from the rotational axis of the propulsor rotor 58 and/or the centerline axis of the turbine engine 22.

The LPC rotor 59 is coupled to and rotatable with the LPT rotor 62. The LPC rotor 59 of FIG. 1, for example, is connected to the LPT rotor 62 through a low speed shaft 68. At least (or only) the LPC rotor 59, the LPT rotor 62 and the low speed shaft 68 collectively form a low speed rotating structure 70; e.g., a low speed spool of the turbine engine 22 and its engine core 44. This low speed rotating structure 70 of FIG. 1 and its members 59, 62 and 68 are rotatable about the propulsion system axis 32. However, it is contemplated the low speed rotating structure 70 may alternatively be rotatable about another axis radially and/or angularly offset from the rotational axis of the propulsor rotor 58 and/or the centerline axis of the turbine engine 22.

The low speed rotating structure 70 is coupled to the propulsor rotor 58 through a rotating structure-to-propulsor (RSP) drivetrain 72. The RSP drivetrain 72 may be configured as a geared drivetrain, where a geartrain 74 (e.g., a transmission, a speed change device, an epicyclic geartrain, etc.) is disposed between and operatively couples the propulsor rotor 58 to the low speed rotating structure 70 and its LPT rotor 62. With this arrangement, the propulsor rotor 58 may rotate at a different (e.g., slower) rotational speed than the low speed rotating structure 70 and its LPT rotor 62. Here, the propulsor rotor 58 and the low speed rotating structure 70 may rotate in a common (the same) direction about the propulsion system axis 32 or in opposite directions about the propulsion system axis 32 depending, for example, upon the specific configuration of the geartrain 74. Alternatively, the RSP drivetrain 72 may be configured as a direct-drive drivetrain, where the geartrain 74 is omitted. With such an arrangement, the propulsor rotor 58 rotates at a common (the same) rotational speed as the low speed rotating structure 70 and its LPT rotor 62.

The inner housing structure 26 of FIG. 1 includes an inner case 76 (e.g., a core case) for the turbine engine 22, an inner nacelle structure 78 (sometimes referred to as an inner fixed structure (IFS)) and an internal inner housing compartment 80 (e.g., an engine core 44 compartment). The inner case 76 is disposed radially outboard of, extends axially along and may circumscribe one or more or all of the engine sections 39A-41B and the engine rotors 59-62. The inner case 76 may thereby house and provide a support structure for the respective engine sections 39A-41B and the engine rotors 59-62. The inner nacelle structure 78 is configured to provide an aerodynamic cover over the engine core 44 and its inner case 76. The inner housing compartment 80 of FIG. 1 is formed by and is disposed radially between the inner case 76 and an inner barrel of the inner nacelle structure 78. The inner housing structure 26 and its inner nacelle structure 78 may also form a radial inner peripheral boundary of the bypass flowpath 48.

The outer housing structure 28 of FIG. 1 includes an outer case 82 (e.g., a fan case) for the turbine engine 22, an outer nacelle structure 84 and an internal outer housing compartment 86. The outer case 82 is disposed radially outboard of, extends axially along and may circumscribe the propulsor section 38 and its propulsor rotor 58. The outer case 82 may thereby house and may be configured as a containment structure for the propulsor section 38 and its propulsor rotor 58. The outer nacelle structure 84 is configured to provide an aerodynamic cover over the outer case 82. The outer housing compartment 86 of FIG. 1 is at least partially formed by and disposed radially between the outer case 82 and an outer portion (e.g., fan cowls) of the outer nacelle structure 84. The outer housing structure 28 and its outer nacelle structure 84 may also form a radial outer peripheral boundary of the bypass flowpath 48.

During operation of the aircraft propulsion system 20 of FIG. 1, ambient air from an environment 88 external to the aircraft and its aircraft propulsion system 20 enters the aircraft propulsion system 20 and its turbine engine 22 through an airflow inlet 90. This air is propelled by the rotating propulsor rotor 58 in a downstream, aft direction towards the propulsion system aft end 36.

An outer stream of the air propelled by the rotating propulsor rotor 58 is directed into the bypass flowpath 48 through its bypass inlet 54, which air entering the bypass flowpath 48 may be referred to as "bypass air". The guide vane structure 30 conditions (e.g., straightens out, de-swirls, etc.) the flow of the bypass air within the bypass duct. This conditioned bypass air is subsequently directed out of the aircraft propulsion system 20 through the bypass exhaust 56 to provide forward thrust. This propulsion of the bypass air may account for a majority of the forward thrust generated by the aircraft propulsion system 20 and its turbine engine 22 of FIG. 1.

An inner stream of the air propelled by the rotating propulsor rotor 58 is directed into the core flowpath 46 through its core inlet 50, which air entering the core flowpath 46 may be referred to as "core air". This core air is compressed by the LPC rotor 59 and the HPC rotor 60 and is directed into a combustion chamber 92 (e.g., annular combustion chamber) of a combustor 94 (e.g., annular combustor) in the combustor section 40. Fuel is injected into the combustion chamber 92 by one or more fuel injectors 96 and mixed with the compressed core air to provide a fuel-air mixture. This fuel-air mixture is ignited and combustion products thereof flow through and sequentially drive rotation of the HPT rotor 61 and the LPT rotor 62. The rotation of the HPT rotor 61 and the LPT rotor 62 respectively drive rotation of the HPC rotor 60 and the LPC rotor 59 and, thus, compression of the air received from the core inlet 50. The rotation of the LPT rotor 62 also drives rotation of the propulsor rotor 58 through the RSP drivetrain 72.

While the turbine engine 22 is described above with a particular two rotating structure arrangement (e.g., a two-spool architecture), the present disclosure is not limited thereto. For example, the LPC rotor 59 may be omitted to configure the LPT rotor 62 as a power turbine (PT) rotor for the propulsor rotor 58. The turbine engine 22 may also or alternatively include another rotating structure with a bladed compressor rotor in the compressor section 39 and a bladed turbine rotor in the turbine section 41; e.g., an intermediate speed spool for the engine core 44.

Figure 2:
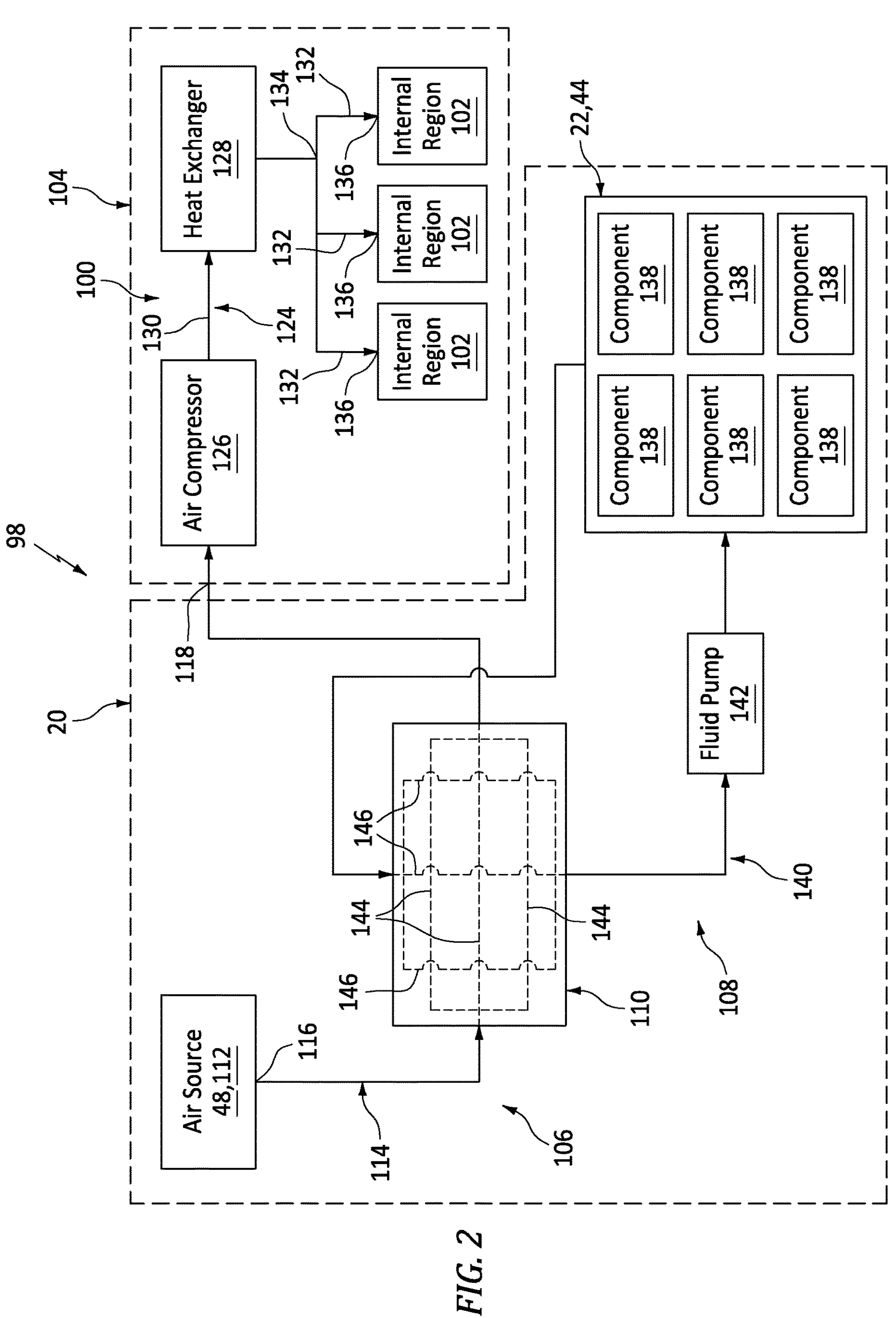
FIG. 2 is a partial schematic illustration of an aircraft system with the aircraft propulsion system and an environmental control system.

FIG. 2 illustrates a system 98 for the aircraft. This aircraft system 98 includes the aircraft propulsion system 20 and an environmental control system (ECS) 100 for one or more internal regions 102 within a fuselage 104 of the aircraft. More particularly, the aircraft system 98 of FIG. 2 includes the turbine engine 22, an air system 106, a working fluid system 108 and an air system-working fluid system (ASWS) heat exchanger 110, where the air system 106 of FIG. 2 includes an air source 112, an air circuit 114 and the environmental control system 100. The working fluid system 108, the ASWS heat exchanger 110, the air source 112 and the air circuit 114 of FIG. 2, along with the turbine engine 22 as described above, are configured as part of the aircraft propulsion system 20. By contrast, the environmental control system 100 may be configured remote from the aircraft propulsion system 20. The environmental control system 100 of FIG. 2, for example, is located outside of the aircraft propulsion system 20. More particularly, the environmental control system 100 of FIG. 2 is arranged internal to an airframe of the aircraft; e.g., at least partially within the aircraft fuselage 104.

The air source 112 is configured to supply a flow of pressurized air (e.g., compressed air, ram air, etc.) independent from the core flowpath 46. For ease of description, the air source 112 is described below as the bypass flowpath 48 of FIG. 1. With this arrangement, the air source 112 may be disposed radially outboard of the engine core 44 and its engine sections 39A-41B (see FIG. 1). The air source 112 may also be configured fluidly discrete from the core flowpath 46 (see FIG. 1). The present disclosure, however, is not limited to such an exemplary arrangement.

Figures 3A, 3B:
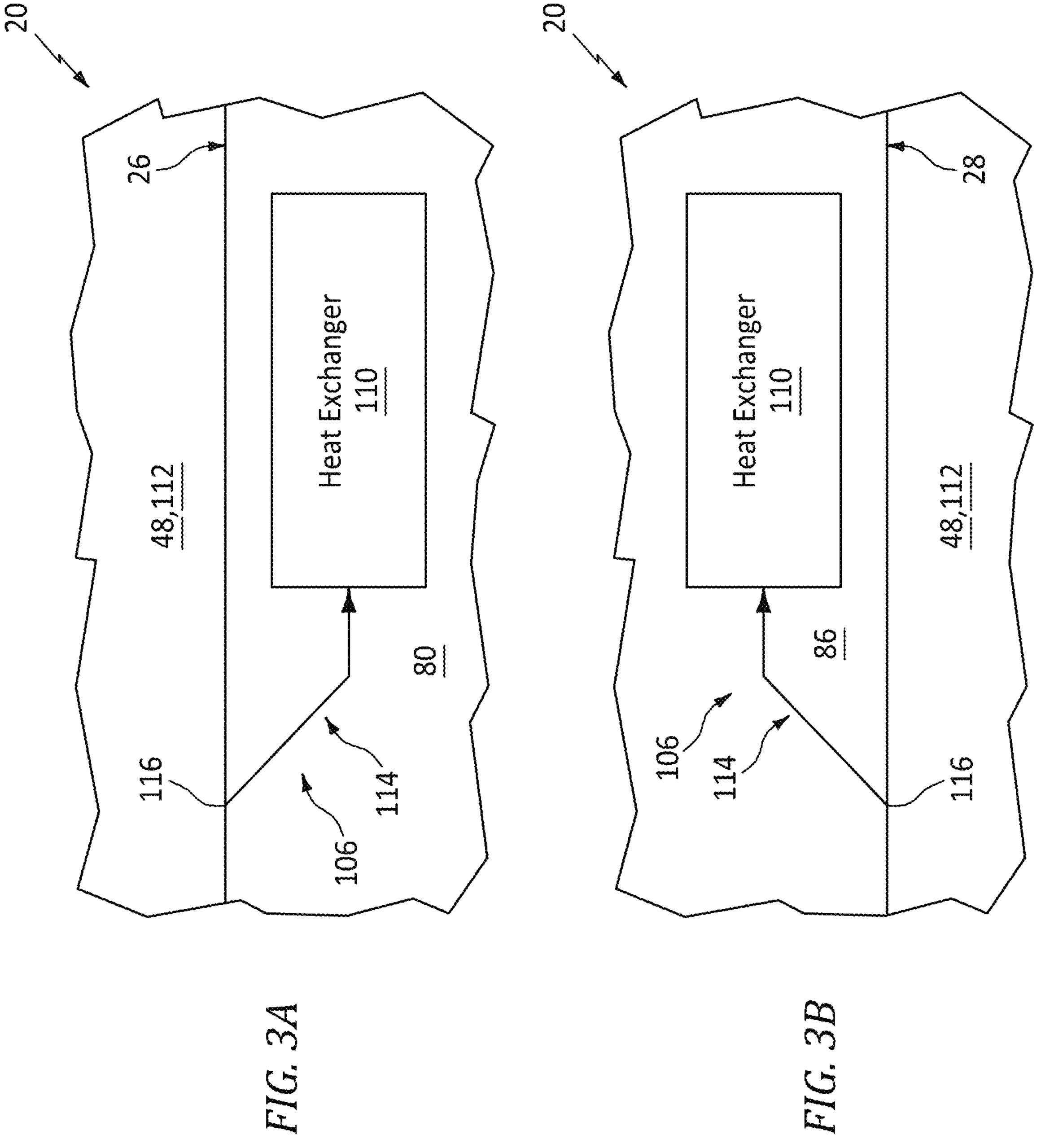
FIGS. 3A-C are partial schematic illustrations of the aircraft propulsion system with various air circuit inlet arrangements.
Figure 3C:
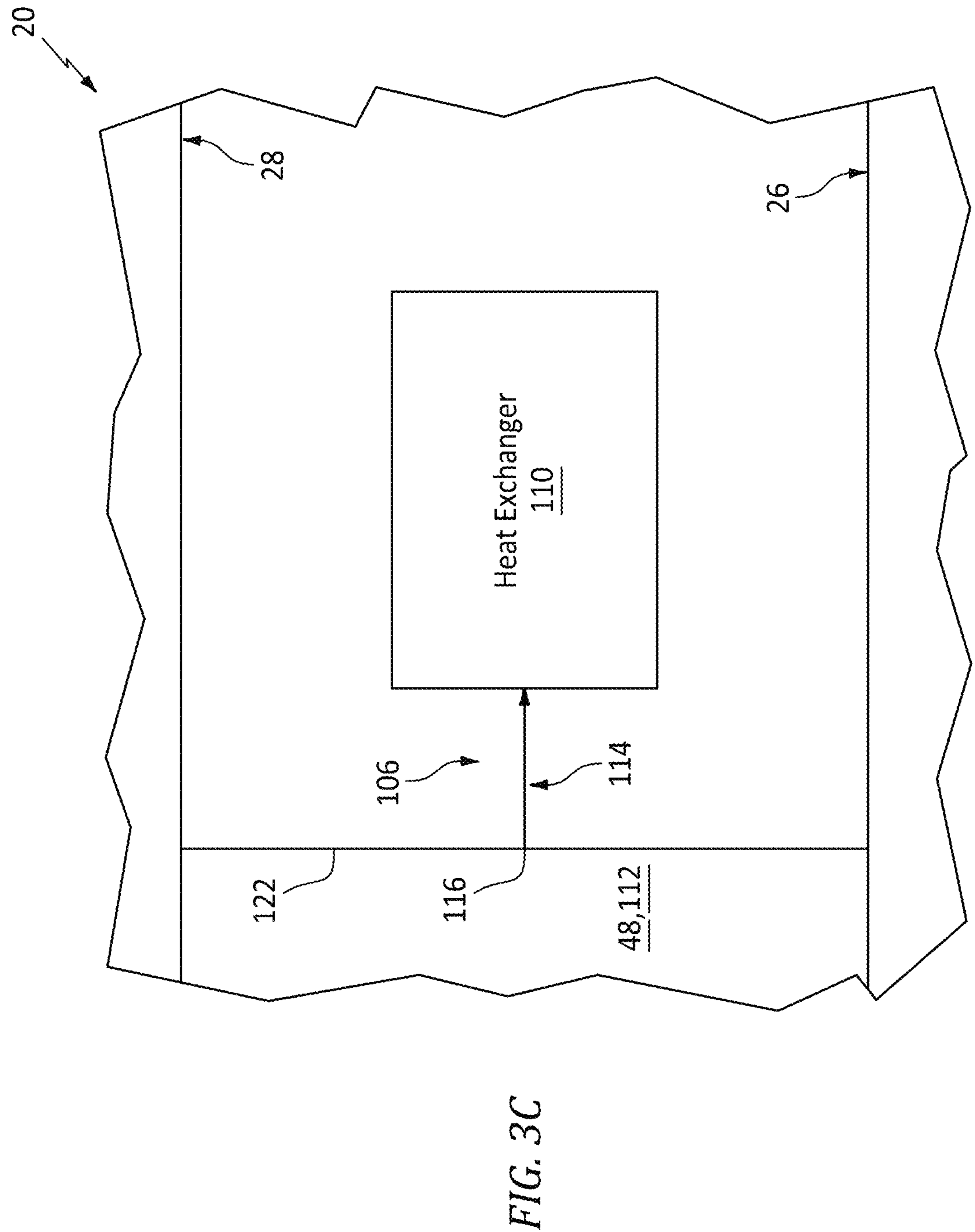

The air circuit 114 is configured as an airflow passage fluidly coupling the bypass flowpath 48 (the air source 112) to the environmental control system 100. The air circuit 114 of FIG. 2, for example, extends longitudinally from an airflow inlet 116 into the air circuit 114 to an airflow inlet 118 into the environmental control system 100. This air circuit 114 of FIG. 2 projects longitudinally out from the circuit inlet 116, through the ASWS heat exchanger 110, and out of the aircraft propulsion system 20 to the environmental control system 100 and its environmental control system (ECS) inlet 118. The circuit inlet 116 is fluidly coupled to the bypass flowpath 48 (the air source 112). The circuit inlet 116 may be disposed at various locations longitudinally along the bypass flowpath 48 between the bypass inlet 54 and the bypass exhaust 56 (see FIG. 1). For example, referring to FIG. 3A, the circuit inlet 116 may be disposed in and/or along the inner peripheral boundary of the bypass flowpath 48; e.g., see location 120A in FIG. 1. In another example, referring to FIG. 3B, the circuit inlet 116 may be disposed in and/or along the outer peripheral boundary of the bypass flowpath 48; e.g., see location 120B in FIG. 1. In still another example, referring to FIG. 3C, the circuit inlet 116 may be arranged with a vane structure 122 (e.g., a bifurcation structure) which extends radially across the bypass flowpath 48 from the inner housing structure 26 to the outer housing structure 28; e.g., see location 120C in FIG. 1. Referring again to FIG. 2, the circuit inlet 116 may be configured as or otherwise include a bleed port (or multiple bleed ports) and/or a scoop (or multiple scoops). The present disclosure, however, is not limited to such exemplary arrangements.

The environmental control system 100 of FIG. 2 includes an environmental control system (ECS) circuit 124, an electric air compressor 126 and an environmental control system (ECS) heat exchanger 128. The ECS circuit 124 is fluidly coupled to and downstream of the air circuit 114. The ECS circuit 124 of FIG. 2, for example, includes a supply leg 130 and one or more distribution legs 132. The supply leg 130 projects longitudinally from the ECS inlet 118, through the air compressor 126 and the ECS heat exchanger 128, to an intersection 134 with the distribution legs 132. At the intersection 134 (e.g., a distribution manifold), the distribution legs 132 may be fluidly coupled in parallel to the supply leg 130. Each of these distribution legs 132 may extend longitudinally to a respective environmental control system (ECS) outlet 136 (or outlets) which is fluidly coupled to a respective one of the internal regions 102 of the aircraft fuselage 104. Examples of these internal regions 102 include, but are not limited to, an aircraft cockpit, an aircraft passenger cabin, an aircraft lavatory, and a temperature controlled aircraft cargo area. The present disclosure, however, is not limited to such an exemplary ECS circuit arrangement. Moreover, it is contemplated the environmental control system 100 may (or may not) also include one or more additional components arranged along the ECS circuit 124. Examples of these additional components may include, but are not limited to, air filter(s), additional heat exchanger (s), additional air compressor(s), flow regulator(s) (e.g., valve(s), valve system(s), flow diverter(s), etc.), sensor device(s), etc.

The environmental control system 100 of FIG. 2 is configured to provide pressurized conditioned air to the internal regions 102 within the aircraft fuselage 104. The supply leg 130 of FIG. 2, for example, receives the pressurized air from the air circuit 114 as "air circuit air" and directs that air circuit air to the air compressor 126. The air compressor 126 is configured to pressurize (e.g., boost a pressure of) the air circuit air and direct that pressurized air into the ECS heat exchanger 128. The ECS heat exchanger 128 is configured to cool (or heat) the pressurized air received from the air compressor 126 (as specified for the environmental control system 100) to provide the conditioned air. This conditioned air is subsequently directed through the distribution legs 132 and then out of the environmental control system 100 respectively into the internal regions 102 of the aircraft fuselage 104 to facilitate provision of a conditioned environment within each respective aircraft fuselage region 102.

The working fluid system 108 is configured to service one or more internal components 138 of the aircraft propulsion system 20. More particularly, the working fluid system 108 is configured to lubricate, cool and/or fluidly power the propulsion system components 138 using a working fluid; e.g., a liquid such as lubricant (e.g., oil), coolant and/or hydraulic fluid. The working fluid system 108 of FIG. 2, for example, includes a working fluid circuit 140 and a working fluid pump 142. The working fluid circuit 140 extends through the working fluid pump 142 and is configured to deliver the working fluid to and/or receive the working fluid from the propulsion system components 138. The working fluid circuit 140, for example, may extend through the propulsion system components 138 and/or otherwise be arranged in fluid and/or thermal communication with the propulsion system components 138. With such an arrangement, the working fluid system 108 may be configured as a thermal management system (TMS), a lubrication system and/or a hydraulic system for the aircraft propulsion system 20 and its propulsion system components 138. Examples of the propulsion system components 138 include, but are not limited to, one or more internal components of the turbine engine 22, one or more electric machines, one or more electronic controllers, one or more pumps, one or more actuators and/or the like. Examples of the engine components include, but are not limited to, bearing(s) supporting the rotating structure(s) 66, 70 (see FIG. 1), bearing(s) in the RSP drivetrain 72 and its geartrain 74 (see FIG. 1), gear system(s) in the geartrain 74 (see FIG. 1), gear system(s) is an accessory gearbox, and/or seal assembly(ies). Examples of the electric machines include, but are not limited to, electric motor(s), electric generator(s) and/or electric motor-generator(s). Examples of the electronic controllers include, but are not limited to, motor controller(s), generator controller(s), motor-generator controller(s) and/or an engine controller.

The ASWS heat exchanger 110 of FIG. 2 includes one or more internal air passages 144 and one or more internal fluid passages 146. Each of these internal passages 144, 146 is formed by the ASWS heat exchanger 110. The air passages 144 collectively form a longitudinal section of the air circuit 114. The fluid passages 146 collectively form a longitudinal section of the working fluid circuit 140. The air passages 144 are fluidly discrete from the fluid passages 146 within the ASWS heat exchanger 110. The air passages 144 and the fluid passages 146 may be arranged to configure the ASWS heat exchanger 110 as a crossflow heat exchanger, a counterflow heat exchanger, a parallel flow heat exchanger, or a hybrid heat exchanger with a combination crossflow, counterflow and/or parallel flow arrangement. The ASWS heat exchanger 110 is configured as a liquid-to-air heat exchanger.

Figure 4:
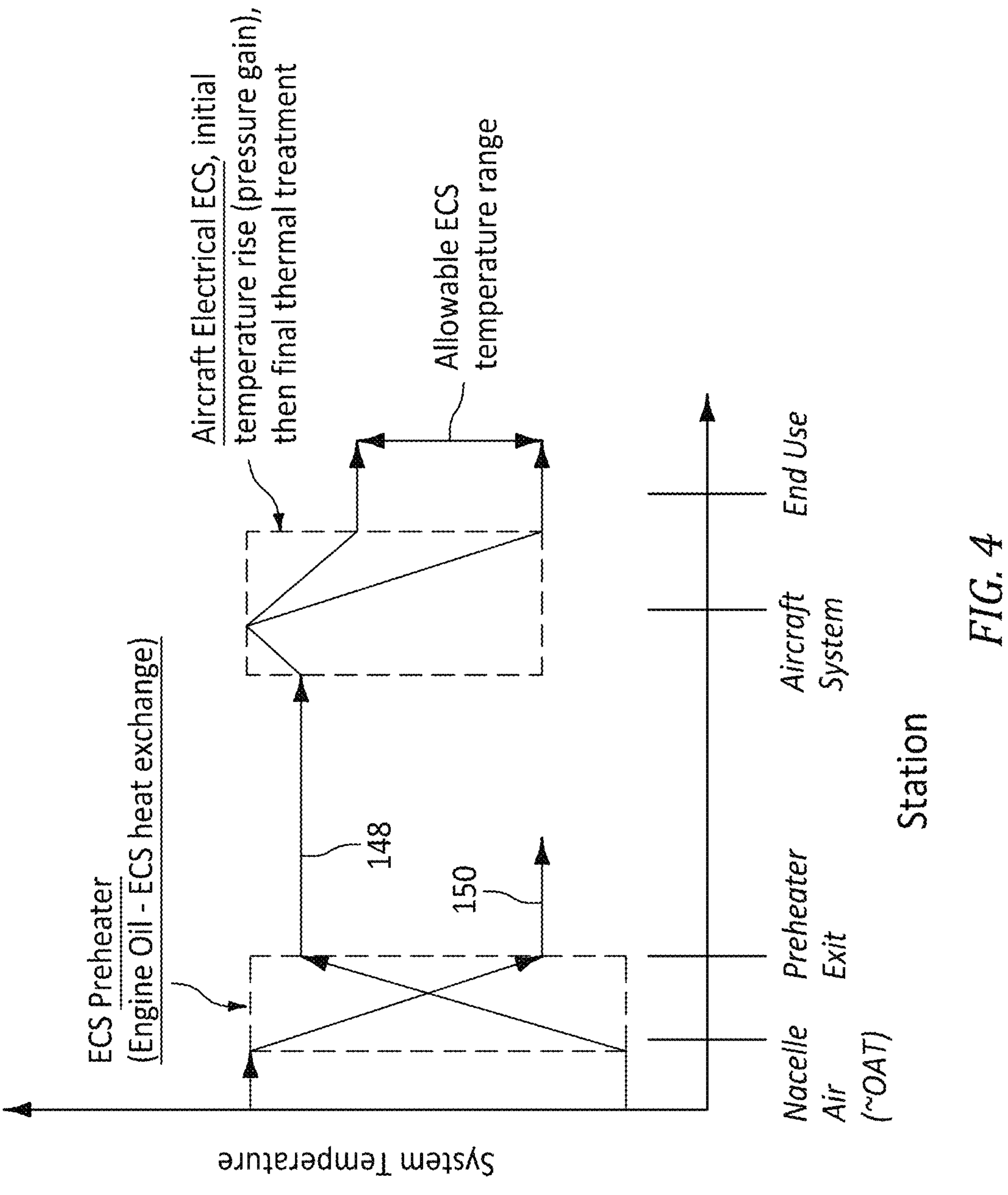
FIG. 4 is a graphical illustration of air and working fluid temperatures during aircraft system operation.

During operation of the aircraft system 98 of FIG. 2, the air circuit 114 bleeds a quantity of the pressurized air from the bypass flowpath 48 (the air source 112) and directs that pressurized air into the ASWS heat exchanger 110 and its air passages 144. This pressurized air directed into the ASWS heat exchanger 110 may be at or about a temperature of ambient air in the external environment 88 (see FIG. 1). Simultaneously, the working fluid circuit 140 directs a quantity of working fluid heated by the propulsion system components 138 into the ASWS heat exchanger 110 and its fluid passages 146. This working fluid directed into the ASWS heat exchanger 110 may be at an elevated temperature which is (e.g., substantially) higher than the temperature of the pressurized air entering the ASWS heat exchanger 110. Within the ASWS heat exchanger 110, heat energy from the relatively hot working fluid is transferred into the relatively cool pressurized air. The ASWS heat exchanger 110 may thereby heat the pressurized air which is subsequently provided to the environmental control system 100 while also cooling the working fluid recirculated for servicing the propulsion system components 138. Thus, the ASWS heat exchanger 110 is a heater for the air system 106 and its pressurized air, and the ASWS heat exchanger 110 is a cooler for the working fluid system 108 and its working fluid. The aircraft system 98 of FIG. 2 may thereby functionally replace two separate heat exchangers for the air system 106 and the working fluid system 108 with the single ASWS heat exchanger 110. With this dual functionality, temperatures of the pressurized air and the working fluid for the air system 106 and the working fluid system 108 may follow curves as shown in FIG. 4. In FIG. 4, line 148 represents the air in the air system 106 and line 150 represents the working fluid in the working fluid system 108. Moreover, by utilizing the bypass flowpath 48 of FIG. 2 as the air source 112, core air need not be bled from the core flowpath 46 (see FIG. 1) for the environmental control system 100 thereby facilitating improved turbine engine efficiency.

In some embodiments, the air system 106 may be configured without any air compressor along the air circuit 114 and between the circuit inlet 116 and the environmental control system 100. In other embodiments, the air system 106 may alternatively be configured with an electric air compressor along the air circuit 114 to boost the pressure of the air received from the bypass flowpath 48 (the air source 112).

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
an environmental control system; and
a propulsion system including an inner housing structure, an outer housing structure, a compressor section, a combustor section, a turbine section, a bypass flowpath, an air circuit, a working fluid system and a heat exchanger;
the inner housing structure housing the compressor section, the combustor section and the turbine section, the inner housing structure forming an inner peripheral boundary of the bypass flowpath;
the outer housing structure spaced radially outboard of the inner housing structure, the outer housing structure forming an outer peripheral boundary of the bypass flowpath;
the bypass flowpath bypassing the compressor section, the combustor section and the turbine section;
the air circuit comprising a circuit inlet fluidly coupled to the bypass flowpath, and the air circuit configured to direct air received from the bypass flowpath through the circuit inlet to the environmental control system, wherein the circuit inlet is disposed along the inner peripheral boundary of the bypass flowpath;
the working fluid system comprising a fluid circuit, and the working fluid system configured to service one or more components of the propulsion system using a liquid working fluid directed through the fluid circuit; and
the heat exchanger configured to transfer heat energy between the air in the air circuit and the liquid working fluid in the fluid circuit.

2. The system of claim 1, wherein the heat exchanger is configured as
a heater for the air in the air circuit; and
a cooler for the liquid working fluid in the fluid circuit.

3. The system of claim 1, wherein the liquid working fluid comprises lubricant.

4. The system of claim 1, wherein the working fluid system is configured to lubricate the one or more components of the propulsion system using the liquid working fluid directed through the fluid circuit.

5. The system of claim 1, wherein the working fluid system is configured to cool the one or more components of the propulsion system using the liquid working fluid directed through the fluid circuit.

6. The system of claim 1, wherein the one or more components of the propulsion system comprise a bearing.

7. The system of claim 1, wherein the one or more components of the propulsion system comprise a gear system.

8. The system of claim 1, wherein the propulsion system further includes a core flowpath extending through the compressor section, the combustor section and the turbine section; and a fan section upstream of an airflow inlet into the core flowpath and an airflow inlet into the bypass flowpath.

9. The system of claim 1, wherein the heat exchanger is disposed in a compartment of the inner housing structure.

10. The system of claim 1, wherein the environmental control system comprises an electric compressor configured to pressurize the air received from the bypass flowpath through the air circuit to provide pressurized air.

11. The system of claim 10, wherein the environmental control system further comprises a second heat exchanger configured to cool the pressurized air.

12. A system for an aircraft, comprising:

a turbine engine comprising an air source and a plurality of engine components;

an inner housing structure housing the plurality of engine components, the inner housing structure forming an inner peripheral boundary of the air source;

an outer housing structure spaced radially outboard of the inner housing structure, the outer housing structure forming an outer peripheral boundary of the air source;

an air system including an air circuit and an environmental control system, the air circuit configured to direct air received from the air source to the environmental control system, wherein a circuit inlet of the air circuit is disposed along the inner peripheral boundary of the air source;

a working fluid system comprising a fluid circuit, the working fluid system configured to lubricate and/or cool the plurality of engine components using a working fluid directed through the fluid circuit; and a heat exchanger arranged along the air circuit between the air source and the environmental control system, the heat exchanger configured to transfer heat energy between the air in the air circuit and the working fluid in the fluid circuit to heat the air and cool the working fluid.

13. The system of claim 12, wherein the turbine engine is a turbofan engine, and the air source is a bypass flowpath of the turbofan engine.

14. The system of claim 12, wherein the turbine engine further includes an engine core, the engine core includes a compressor section, a combustor section and a turbine section, and the air source is located outside of the engine core.

15. The system of claim 12, wherein the turbine engine further includes a compressor section;

a combustor section;

a turbine section; and a flowpath extending through the compressor section, the combustor section and the turbine section, wherein the air source is fluidly independent of the flowpath.

16. A system for an aircraft, comprising:

an environmental control system; and a propulsion system including an inner housing structure, an outer housing structure, a vane structure, a compressor section, a combustor section, a turbine section, a bypass flowpath, an air circuit, a working fluid system and a heat exchanger;

the inner housing structure housing the compressor section, the combustor section and the turbine section, the inner housing structure forming an inner peripheral boundary of the bypass flowpath;

the outer housing structure spaced radially outboard of the inner housing structure, the outer housing structure forming an outer peripheral boundary of the bypass flowpath;

the vane structure extending radially across the bypass flowpath from the inner housing structure to the outer housing structure;

the bypass flowpath bypassing the compressor section, the combustor section and the turbine section;

the air circuit comprising a circuit inlet fluidly coupled to the bypass flowpath, and the air circuit configured to direct air received from the bypass flowpath through the circuit inlet to the environmental control system, wherein the circuit inlet is arranged on the vane structure;

the working fluid system comprising a fluid circuit, and the working fluid system configured to service one or more components of the propulsion system using a liquid working fluid directed through the fluid circuit; and the heat exchanger configured to transfer heat energy between the air in the air circuit and the liquid working fluid in the fluid circuit.

17. The system of claim 16, wherein the circuit inlet is disposed at a leading edge of the vane structure.

18. The system of claim 16, wherein the vane structure comprises a bifurcation structure.

19. The system of claim 16, wherein the heat exchanger is arranged in the vane structure.

* * * * *